US009026655B2

(12) United States Patent
Duvur et al.

(10) Patent No.: US 9,026,655 B2
(45) Date of Patent: May 5, 2015

(54) METHOD AND SYSTEM FOR LOAD BALANCING

(75) Inventors: Sreeram Duvur, Freemont, CA (US);
Harsha R. Aswath, Bangalore (IN);
Vishwas Bhari, Bangalore (IN)

(73) Assignee: Oracle America, Inc., Redwood Shores, CA (US)

( * ) Notice: Subject to any disclaimer, the term of this patent is extended or adjusted under 35 U.S.C. 154(b) by 1216 days.

(21) Appl. No.: 11/700,646

(22) Filed: Jan. 31, 2007

(65) Prior Publication Data
US 2008/0183876 A1 Jul. 31, 2008

(51) Int. Cl.
*G06F 15/173* (2006.01)
*H04L 29/08* (2006.01)

(52) U.S. Cl.
CPC .......... *H04L 67/025* (2013.01); *H04L 67/1008* (2013.01); *H04L 67/1029* (2013.01); *H04L 67/1031* (2013.01); *H04L 67/1002* (2013.01); *H04L 67/1025* (2013.01); *H04L 67/1012* (2013.01); *H04L 67/1017* (2013.01)

(58) Field of Classification Search
USPC .................................................. 709/226, 241
See application file for complete search history.

(56) References Cited

U.S. PATENT DOCUMENTS

| 6,374,297 | B1 * | 4/2002 | Wolf et al. ..................... 709/226 |
| 6,765,864 | B1 * | 7/2004 | Natarajan et al. ............. 370/224 |
| 7,757,236 | B1 * | 7/2010 | Singh ............................. 718/105 |
| 2004/0019680 | A1 * | 1/2004 | Chao et al. ..................... 709/226 |
| 2004/0024767 | A1 * | 2/2004 | Chen ............................. 707/100 |
| 2004/0111725 | A1 * | 6/2004 | Srinivasan et al. ............ 718/105 |
| 2004/0186905 | A1 * | 9/2004 | Young et al. .................. 709/225 |
| 2004/0268357 | A1 * | 12/2004 | Joy et al. ....................... 718/105 |
| 2005/0182838 | A1 * | 8/2005 | Sheets et al. .................. 709/226 |
| 2006/0015291 | A1 * | 1/2006 | Parks et al. .................... 702/179 |
| 2008/0091806 | A1 * | 4/2008 | Shen et al. ..................... 709/223 |
| 2009/0070738 | A1 * | 3/2009 | Johnson ......................... 717/106 |

OTHER PUBLICATIONS

PrismTech Ltd., "OpenFusion Load Balancing Service", Tyne & Wear, UK, 2006, accessed Nov. 18, 2009 at <http://web.archive.org/web/20060311163443/www.prismtechnologies.com/section-item.asp?sid4=73&sid3=189&sid2=10&sid=18&id=399>.*

* cited by examiner

*Primary Examiner* — Liangche A. Wang
(74) *Attorney, Agent, or Firm* — Osha Liang LLP

(57) ABSTRACT

A method for load balancing in a server cluster that includes configuring a load management application to use a load balancing decision function selected from a plurality of load balancing decision functions, receiving a request in the server cluster, selecting a request handler from a plurality of request handlers by the load management application using the load balancing decision function, and transmitting the request to the request handler, wherein the plurality of load balancing decision functions that includes a default load balancing decision function and a custom load balancing decision function.

19 Claims, 5 Drawing Sheets

METHOD AND SYSTEM FOR LOAD BALANCING

BACKGROUND

In a client-server network, a client sends a request to a server. In turn, the server processes the request and may or may not send a response back to the client. In an attempt to ensure quality of service, a server cluster having multiple servers may be used to process the request. Furthermore, one or more servers in the server cluster may be able to process the request. That is, multiple servers may have a replicated service that performs the same actions in response to the same request. Thus, from the point of view of the client sending the request, any appropriately configured server in the server cluster may receive and process the request and produce the same results.

A management application may be installed on the server cluster to permit a system administrator to maintain the cluster. This management application may include the necessary functionality for ensuring that requests are processed by the correct server in a timely manner. Typically, a management application also includes functionality for monitoring the health of each server, updating the servers as necessary, detecting failure in the server cluster, and performing load balancing. Furthermore, the management application may include functionality for performing load balancing among the servers in the cluster.

Typically, the load balancing functionality provided by the management application is uniform for server clusters having the management application. That is, the load balancing logic used to decide which server should process the request is the same. The only configuration option available to the system administrator managing the server cluster is a configuration file that the system administrator may change to reflect the configuration of the server cluster.

SUMMARY

In general, in one aspect, the invention relates to a method for load balancing in a server cluster that includes configuring a load management application to use a load balancing decision function selected from a plurality of load balancing decision functions, receiving a request in the server cluster, selecting a request handler from a plurality of request handlers by the load management application using the load balancing decision function, and transmitting the request to the request handler, wherein the plurality of load balancing decision functions that includes a default load balancing decision function and a custom load balancing decision function.

In general, in one aspect, the invention relates to a server cluster that includes a plurality of servers configured to execute a plurality of request handlers for receiving requests, and a load management application configured to use a load balancing decision function selected from a plurality of load balancing decision functions to select a request handler, wherein the load management application selects a request handler from a plurality of request handlers using the load balancing decision function when the server cluster receives a request, and transmits the request to the request handler, wherein the plurality of load balancing decision functions that includes a default load balancing decision function and a custom load balancing decision function.

In general, in one aspect, the invention relates to a computer usable medium that includes computer readable program code embodied therein for causing a computer system to load balance in a server cluster by configuring a load management application to use a load balancing decision function selected from a plurality of load balancing decision functions, receiving a request in the server cluster, selecting a request handler from a plurality of request handlers by the load management application using the load balancing decision function, and transmitting the request to the request handler, wherein the plurality of load balancing decision functions that includes a default load balancing decision function and a custom load balancing decision function.

Other aspects of the invention will be apparent from the following description and the appended claims.

DETAILED DESCRIPTION

Figure 1:
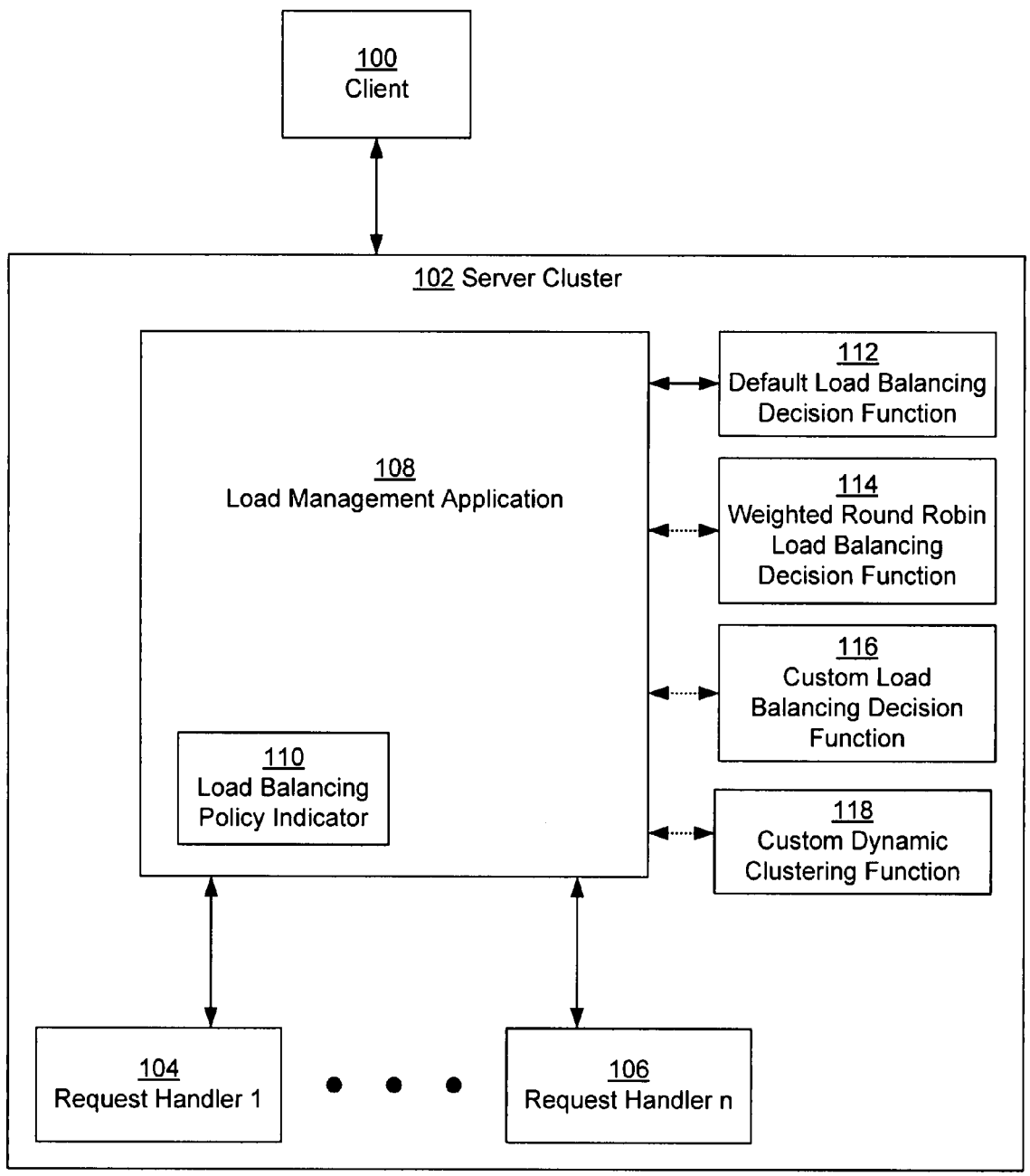
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for performing load balancing in an application cluster. Specifically, embodiments of the invention provide a mechanism for a user to create a custom load balancing decision function. The custom load balancing decision function may then be used to replace a default load balancing decision function. Consequently, embodiments of the invention create a mechanism for the custom load balancing decision function to act as a plug-in for performing load balancing.

A user corresponds to an individual and/or application that includes functionality to create a custom load balancing decision function (described below). Typically, the user has administrator privileges. Often, the user is located at a customer site, which corresponds to the location of the customer. In one or more embodiments of the invention, a customer is an individual or business entity that purchases, rents, or enters any other agreement to use a server cluster (described below) and/or load management application (described below). For example, the user may correspond to a network administrator employed by or contracted with the customer.

FIG. 1 shows a schematic diagram of a system in accordance with one or more embodiments of the invention. As shown in FIG. 1, the system includes a client (100) and a server cluster (102) in accordance with one or more embodiments of the invention.

A client (100) includes functionality to send requests to the server cluster (102). For example, a client (100) may correspond to an individual computer system, another server cluster, a server, the customer, etc. The request may correspond to virtually any type of request for performing an action. For example, the request may be for updating a database, registering the client as a listener, performing computational tasks, receiving the results of an action, obtaining information, transmitting information to the server cluster (102), etc.

A server cluster (102) is connected to the client (100) in accordance with one or more embodiments of the invention. Typically, the server cluster (102) is connected to the client via one or more networks (not shown). The network may correspond to any type of mechanism for acting as an intermediary to transmit requests. For example, the network may be a local area network or a wide area network.

A server cluster (102) corresponds to a collection of servers (not shown). For example, the server cluster may correspond to a supercomputer, a distributed computer system, a shared memory multiprocessor, etc. Each server in the server cluster corresponds to a processor which may or may not have separate memory from the server cluster. Servers in the server cluster have attributes. For example, the attributes of a server may include the uniform resource locator of the server, the number of applications executing on the server, hardware capabilities of the server (e.g., processing power, memory, etc.), response time, and other such information. Each server in the server cluster includes functionality to execute request handlers (e.g., request handler 1 (104), request handler n (106)) and a load management application (108). Each of these is described below.

A request handler (e.g., request handler 1 (104), request handler n (106)) includes functionality to process requests. Typically, the result of processing a request is the same regardless of the request handler processing the request. Moreover, the request handlers (e.g., request handler 1 (104), request handler n (106)) may correspond to instances of the same application or instances of different applications.

Each request handler also has properties that correspond to the capabilities of the request handler. For example, the properties may correspond to response time of the request handler, an identifier of the request handler, throughput for processing requests, an indication of whether the request handler includes functionality to participate in secure communications, attributes of the server upon which the request handler is executing, and/or any other such properties.

Interposed between the request handlers (e.g., request handler 1 (104), request handler n (106)) and the client (100) is a load management application (108). A load management application (108) includes functionality to manage the request handlers (e.g., request handler 1 (104), request handler n (106)) and/or servers in the server cluster (102). For example, the load management application (108) may include functionality to monitor the performance of each server, update applications executing on the servers, detect failure in the server cluster, and perform load balancing.

In one or more embodiments of the invention, in order to perform load balancing, the load management application includes functionality to use load balancing decision functions (e.g., default load balancing decision function (112), weighted round robin load balancing decision function (114), custom load balancing decision function (116)). Each load balancing decision function (e.g., default load balancing decision function (112), weighted round robin load balancing decision function (114), custom load balancing decision function (116)) includes functionality to implement a policy for choosing the request handler (e.g., request handler 1 (104), request handler n (106)) to process a request. The policy defines how a request handler is chosen. The load balancing decision functions (e.g., a default load balancing decision function (112), a weighted round robin load balancing decision function (114), custom load balancing decision function (116)) and associated policies are described below.

A default load balancing decision function (112) corresponds to the load balancing decision function that is part of the load management application (108). Specifically, when the load management application (108) is sent to a customer, the load management application (108) includes the default load balancing decision function (112) in accordance with one or more embodiments of the invention. In one or more embodiments of the invention, the default load balancing decision function (112) implements a round robin load balancing policy. The round robin load balancing policy specifies that each request handler processes requests in turn. For example, request handler 1 processes the first request, request handler 2 processes the second request, etc.

In addition to or instead of the default load balancing decision function (112), the load management application (108) may also include a weighted round robin load balancing decision function (114). Specifically, the weighted round robin decision function may correspond to the default load balancing decision function or may correspond separate load balancing decision function. A weighted round robin load balancing decision function implements a weighted round robin load balancing policy.

A weighted round robin load balancing policy uses weights to specify a number of requests for each request handler (e.g., request handler 1 (104), request handler n (106)). For example, if request handler one has a weight of eighty and request handler two has a weight of twenty, then for every hundred requests received, eighty requests are sent to request handler one and twenty requests are sent to request handler two.

The weights for the weighted round robin load balancing function (114) may be set by a user or may be generated by the weighted round robin load balancing decision function (114). Specifically, the user may access configuration settings of the load management application or of the weighted round robin load balancing decision function. The configuration settings may be accessible to the user through a configuration file or a configuration application.

Alternatively, the weights may be generated by the weighted round robin load balancing decision function (114). For example, the weighted round robin load balancing decision function (114) may include functionality to dynamically detect the throughput of each of the request handlers (e.g., request handler 1 (104), request handler n (106)) and update the weights accordingly.

In addition to load balancing decision functions provided by the load management application (e.g., a default load balancing decision function (112), a weighted round robin load balancing decision function (114)), the load management application (108) also includes functionality to use a custom load balancing decision function (116). A custom load balancing decision function (116) corresponds to a load balancing decision function that is specified by a user. Specifically, the policy of the load balancing decision function is specified by the user.

In one or more embodiments of the invention, the custom load balancing decision function (116) is a plug-in to the load management application (108). Specifically, the load management application (108) is designed to identify the location of and execute the custom load balancing decision function (116). More specifically, a custom load balancing decision function (116) may be created by the user to implement the application programming interface (API) specified by the load management application (108) in accordance with one or more embodiments of the invention. For example, the user may create the custom load balancing decision function by creating a programming language function or method in a programming language, such as Java, C++, C, etc., that has the API required by the load management application (108).

In one or more embodiments of the invention, the API specified by the load management application (108) requires that the output parameter of the custom load balancing decision function (116) identifies the chosen request handler (e.g., request handler 1 (104), request handler n (106)). For example, an identifier may correspond to the uniform resource identifier or uniform resource locator of the request handler, an indirect pointer to the request handler, etc.

The API of the load management application (108) may also specify the input parameters, such as request attributes, an identifier of the previous request handler, a list of request handlers, or any other possible input parameter. A request attribute corresponds to a required attribute of the request handler selected to process the request. For example, a request attribute may correspond to a throughput requirement, a memory requirement, a security capabilities requirement, a schedule requirement, a location requirement, or a reliability requirement. A throughput requirement may correspond to the number of requests that the request handler is processing within a certain time frame. A memory requirement may correspond to an amount of memory dedicated to the request handler. A security capabilities requirement may specify the security level of the request handler. A schedule requirement may correspond to a requirement that specifies the priority of the request with respect to other requests processed by the request handler. A location requirement may specify a location of the server upon which the request handler is executing. A reliability requirement may specify the minimum mean time between failures of the request handler.

For example, the request attribute may specify the required security capabilities of a request handler selected to handle the request. Thus, only request handlers having the required security capabilities may be chosen to process the request. In a second example, the request attributes may specify the required processing capabilities of the request handler. Thus, in the second example, only request handlers having an amount of memory specified by the request attribute may be chosen to process the request.

As an alternative to or in addition to, one or more of the above input parameters and/or output parameters specified by the application programming interface may be global variables. A global variable is not owned by any subroutine or class and therefore may be simultaneously visible to the custom load balancing decision function and the load management application.

By having the load management application (116) accept a custom load balancing decision function (116), the user may implement a custom policy that is specific to the customer. Moreover, the user may design the custom load balancer to adhere to the needs of the customer and server cluster.

For example, the policy may specify that during certain hours request handler X should not process requests because the server upon which request handler X is executing also executes real-time applications during the certain hours. In another example, the policy may specify that requests should be sent the nearest request handler. For example, the policy may specify that a request originating in Indonesia should be processed by a request handler in or near Indonesia and a request originating in Canada should be processed by a request handler in or near Canada.

Continuing with FIG. 1, in order to determine which load balancing decision function to use, the load management application (108) includes a load balancing policy indicator (110) in accordance with one or more embodiments of the invention. A load balancing policy indicator (110) corresponds to an identifier of which load balancing decision function to use. For example, the load balancing policy indicator (110) may correspond to a variable that has a value corresponding to the name of the load balancing decision function (e.g., default, weighted, custom, etc.), the location of the load balancing decision function (e.g., address in file system), a code identifying the load balancing decision function (e.g., a value of zero means use default load balancing decision function, a value of one means use weighted round robin load balancing decision function, a value of two means use custom load balancing decision function, etc.), and/or any other method to identify the load balancing decision function. Further, the load balancing policy indicator (110) may be maintained in a configuration file of the load management application, as a runtime variable of the load management application, etc.

In addition to the load balancing decision function (e.g., a default load balancing decision function (112), a weighted round robin load balancing decision function (114), custom load balancing decision function (116)), the server cluster (102) may include at least one dynamic clustering function (e.g., custom dynamic clustering function (118)). A dynamic clustering function includes functionality to manage the server cluster/load balancing decision function when changes occur in the server cluster (102). Specifically, the dynamic clustering function may be used when the server cluster (102) is initialized, when a server or request handler fails, and/or when a server or request handler is added to the server cluster (102). In one or more embodiments of the invention, the dynamic clustering function may correspond to a default dynamic clustering function (not shown) or a custom dynamic clustering function (118).

A default dynamic clustering function corresponds to the dynamic clustering function that is part of the load management application (108). Specifically, when the load management application (108) is sent to a customer, the load management application (108) may include the default dynamic clustering function in accordance with one or more embodiments of the invention.

In addition to or instead of using a default dynamic clustering function, the load management application (108) includes functionality to use a custom dynamic clustering function (118). A custom dynamic clustering function (118) corresponds to a dynamic clustering function that is specified by the user. In one or more embodiments of the invention, the API of the custom dynamic clustering function (118) is specified by the load management application (108). In one or more embodiments of the invention, the custom dynamic clustering function (118) is a plug-in to the load management application (108). Specifically, the load management application (108) includes functionality to determine whether a custom dynamic clustering function (118) exists, to identify the location of the custom dynamic clustering function (118), and to execute the custom dynamic clustering function (118).

The custom dynamic clustering function (118) allows the user to specify how failure in the server cluster is handled. For example, consider the scenario in which a user has three servers each executing a request handler. The custom load balancing decision function may specify that requests are processed by only the first two request handlers so that the server with the third request handler may perform unrelated processing. Continuing with the example, the custom dynamic clustering function may specify that when either of the first two servers/request handlers fails, requests are routed to the third server and request handler.

Figure 2:
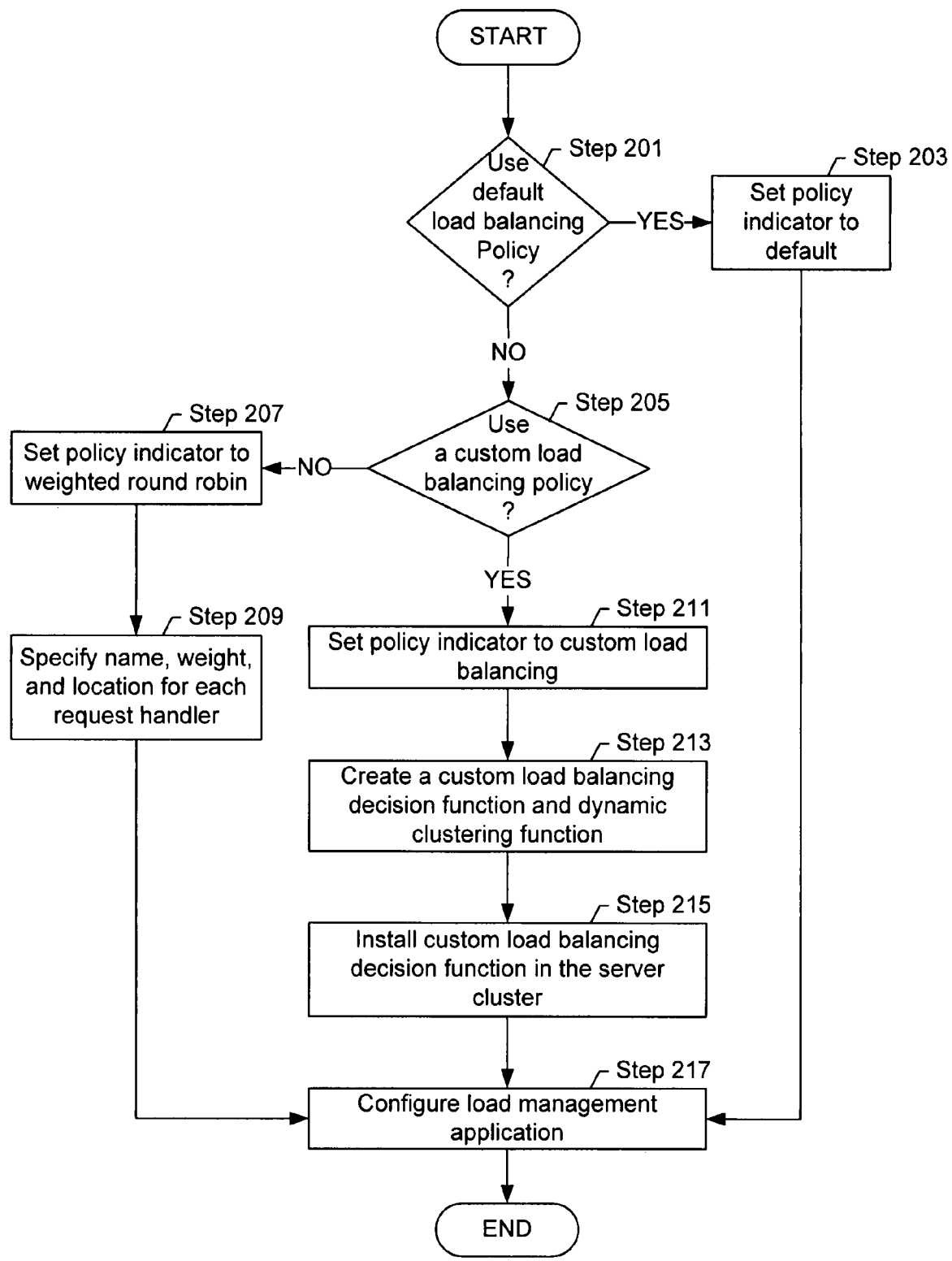
FIG. 2-4 show flowcharts of methods in accordance with one or more embodiments of the invention.
Figure 3:
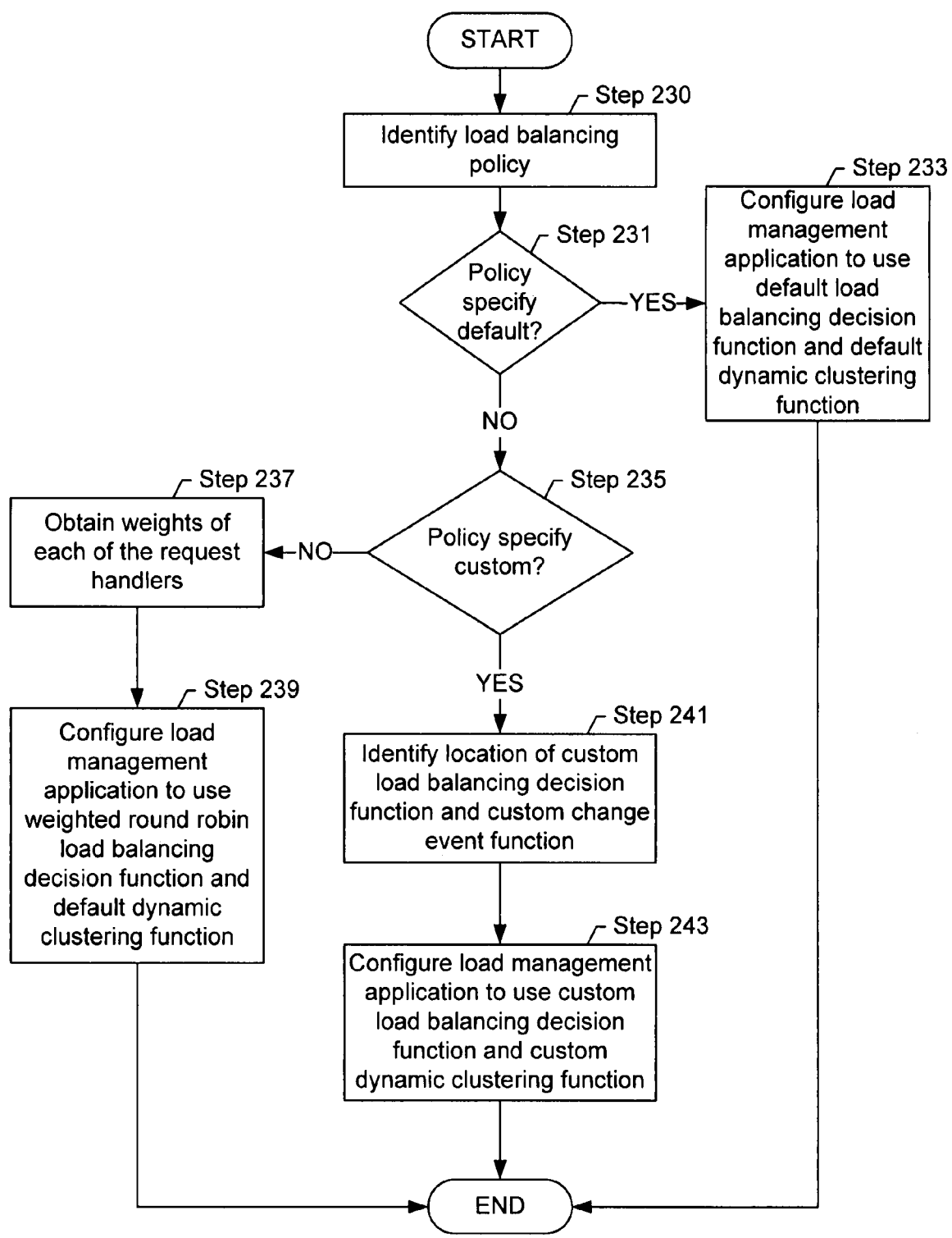
Figure 4:
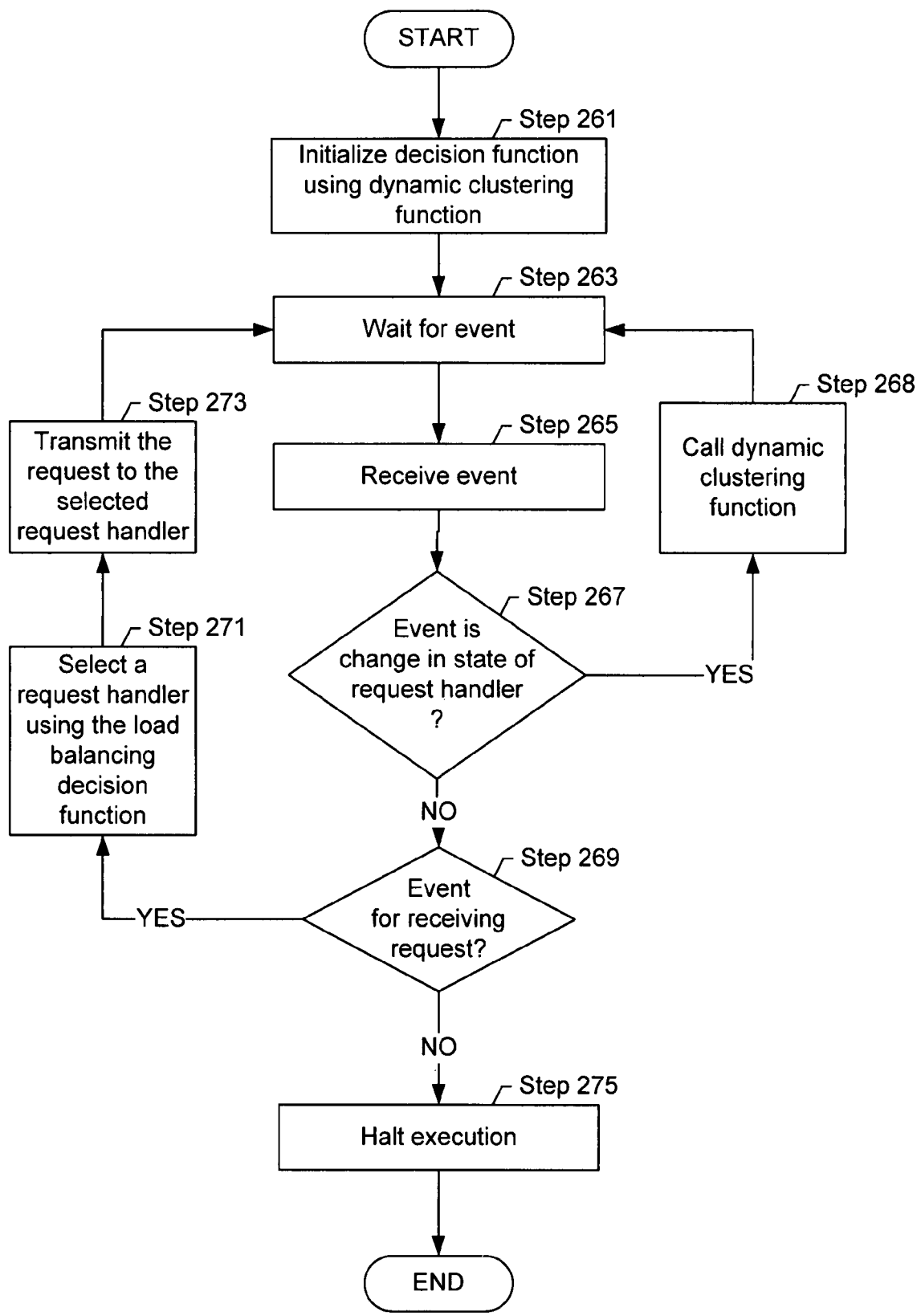

FIG. 2-4 show flowcharts of methods in accordance with one or more embodiments of the invention. While the various steps in these flowcharts are presented and described sequentially, one of ordinary skill will appreciate that some or all of the steps may be executed in different orders and some or all of the steps may be executed in parallel.

FIG. 2 shows a flowchart of a method for a user to implement load balancing. Initially, a determination is made whether to use the default load balancing policy (Step 201). At this stage, the user determines whether the default load balancing decision function corresponding to the default load balancing policy is sufficient for the customer in one or more embodiments of the invention. If the user decides to use the default load balancing policy, then the load balancing policy indicator is set to default (Step 203). Setting the load balancing policy indicator to default may correspond to accessing the configuration file of the load management application. For example, when installing the load management application on the customer site, an installation program of the load management application may ask the user to select the load balancing decision function to use. Alternatively, the user may open a configuration file that has one or more configuration variables corresponding to the load balancing policy indicator. In another alternative, rather than requiring that the user actively set the load balancing policy indicator to default, the load balancing policy indicator may come preset to default. Thus, without the user performing any actions, a default load balancing decision function may be used.

Alternatively, if the user decides not to use a default load balancing policy, than a determination is made whether to use a custom load balancing policy (Step 205). If the user decides not to use a custom load balancing policy, then the user may decide to use a weighted round robin load balancing policy. Accordingly, the load balancing policy indicator is set to weighted round robin (Step 207). Setting the load balancing policy indicator to weighted round robin may be performed as described above. Specifically, a user may access the configuration file, use an installation application for the load management application, or use the load management application to set the load balancing policy indicator.

Next, the name, weight, and location for each request handler are specified (Step 209). When specifying the name, weight, and location, the user may have to use a data file that includes the aforementioned information or may access a configuration file of the load management application. Further, an installation application for the load management application may detect the name and location of each of the request handlers. In such scenario, the user may merely input the weights for each request handler using the installation application. Alternatively, a user may update a configuration file of the weighted round robin load balancing decision function to reflect the weights of each of the request handlers.

Rather than having the user specify the weights, the weighted round robin may be initialized with the same weight assigned to each request handler. Then, during execution of the request handlers, the weights may be updated to reflect performance of each of the request handlers. Thus, a request handler achieving better performance may receive a higher weight than request handlers achieving lower performance.

Alternatively, if the user decides to use a custom load balancing policy, then the load balancing policy indicator is set to custom load balancing (Step 211). Setting the load balancing policy indicator may be performed as described above. Next, a custom load balancing decision function and a custom dynamic clustering function is created (Step 213) in accordance with one or more embodiments of the invention. At this stage, the user may identify a custom load balancing policy that is applicable to the server cluster of the customer.

Using the custom load balancing policy and the API required by the load management application, the user may design a load balancing decision function that implements the load balancing policy such that the input parameters into the load balancing decision function and the output parameters of the load balancing decision function conform to the API. Further, the name of the function and the programming language used to create the custom load balancing decision function may also be designed so as to conform to the requirements of the API.

Similar to creating the custom load balancing decision function, the user may also create the custom dynamic clustering function. Specifically, the user may identify a set of operations that should occur when a change occurs in the server cluster. For example, the set of operations may include generating a list of available or failed servers and/or request handlers, reconfiguring the server cluster, or performing any other action. Once the set of operations is identified, then the dynamic clustering function may be designed according to the API specified by the load management application. Alternatively, the user may desire to use a default dynamic clustering function or not to use a dynamic clustering function.

Once the custom load balancing decision function is created, the custom load balancing decision function is installed in the server cluster (Step 215). Installing the custom load balancing decision function may involve, for example, compiling and creating an executable of the custom load balancing decision function. In addition to installing the custom load balancing decision function, the custom dynamic clustering function may also be installed on the server cluster if a custom dynamic clustering function is desired.

Continuing with FIG. 2, regardless of which load balancing decision function is used, the load management application is configured to use the load balancing decision function (Step 217). FIG. 3 shows a flowchart for configuring the load management application to use the load balancing decision function.

Initially, the load balancing policy is identified (Step 230). Specifically, the load balancing policy indicator is accessed to determine which load balancing decision function to use. Next, a determination is made whether the load balancing policy indicator specifies the default decision function (Step 231). If the load balancing policy indicator specifies the default decision function, then the load management application is configured to use the default load balancing decision function and the default dynamic clustering function (Step 233). Specifically, the load management application is linked to the default load balancing decision function. Further, if a default dynamic clustering function is specified in the configuration file of the load management application, then the load management application may be linked to the default dynamic clustering function. Linking the load management application to the default load balancing decision function may be performed when execution of the load management application is initiated.

Alternatively, if the load balancing policy indicator does not specify a default load balancing policy, then a determination is made whether the load balancing policy specifies a custom load balancing decision function (Step 235). If the load balancing policy does not specify a custom load balancing decision function, then a weighted round robin load balancing policy is to be used. The weights of each of the request handlers are obtained (Step 237). Specifically, the configuration file may be accessed to identify the weights of the request handlers. Thus, when execution of the weighted round robin load balancing decision function is initiated, the weights are read and applied to the request handlers.

Accordingly, the load management application is configured to use the weighted round robin load balancing decision function and the default dynamic clustering function (if specified in the configuration file of the load management application) (Step 239). Specifically, the location of the weighted round robin load balancing decision function and default dynamic clustering function is linked to the load management application.

Alternatively, if the load balancing policy specifies the custom load balancing decision function, then the location of the custom load balancing decision function and the custom dynamic clustering function (if any) is accessed (Step 241). Specifically, the custom load balancing decision function and the custom dynamic clustering function may be stored in a location specified by the user or a location specified by the API in accordance with one or more embodiments of the invention. If the location is specified by the user, then the configuration file of the load management application may be accessed to identify the location.

Next, the load management application is configured to use the custom load balancing decision function and the custom dynamic clustering function (Step 243). Specifically, the load management application may use the identified location and link to the custom load balancing decision function. Thus, when a request arrives at the server cluster, the load management application may query the custom load balancing decision function to identify the load balancer for processing the request.

FIG. 4 shows a flowchart of a method for processing events, such as requests and changes to the servers of the server cluster, in accordance with one or more embodiments of the invention. Initially, the load balancing decision function is initialized using the dynamic clustering function (Step 261). Specifically, the dynamic clustering function may specify initialization steps, such as how to obtain configuration variables for the load balancing decision function. Alternatively, the dynamic clustering function may only be used in the event of failure.

Next, the load management application waits for an event (Step 263). An event may occur for example, when a change in the state of the request handlers occurs. For example, if a request handler halts execution, fails, or is added to the server cluster, the change in the state of the request handlers may trigger an event. Another type of event occurs when a request is received by the server cluster.

Accordingly, a determination is made whether the event corresponds to a change in the state of the request handlers of the server cluster (Step 267). If the event corresponds to a change, then the dynamic clustering function is called (Step 261). Specifically, operations specified by the dynamic clustering function are performed. If the dynamic clustering function corresponds to a custom dynamic clustering function, then the user has specified how changes in the request handlers are handled. For example, consider the scenario in which a request handler fails in a real-time system. The user may request that in such scenario, the user is sent immediate notification of the failure and a new request handler is initialized. In another example, the user may desire that the load balancing decision function reconfigure itself when a change occurs to account for the failed request handler.

Alternatively, if the event does not correspond to a change in the state of the request handlers of the server cluster, then a determination is made whether the event corresponds to receiving a request (Step 269). Specifically, when a request is received from a client by the server cluster, then the request is routed to the load management application in accordance with one or more embodiments of the invention. Next, the request handler is selected using the load balancing decision function (Step 271). Selecting the request handler may involve the load management application using the API specified by the load management application and implemented by the load balancing decision function.

For example, the load management application may perform a method call on the custom load balancing decision function. The load balancing decision function then selects the request handler to process the request and sends an identifier that identifies the selected request handler to the load management application. In order to select the request handler, the load balancing decision function may track the previously used request handler and any other information necessary (e.g., the number of requests processed by each request handler) to identify the selected request handler.

After receiving the identifier, the load management application may transmit the request to the selected request handler (Step 273). In the process of transmitting the request, the load management application may perform such actions as reformatting the request, adding or removing data from the request, or performing any other action necessary to transmit the request.

When the request handler receives the request, then the request is processed by the request handler (Step 273). When processing the request, multiple actions may result from processing the request. For example, the request handler may update a database, register the client as a listener, perform computational tasks, generate output from the computation tasks, receive the results of an action, obtain information, transmit information to another server, etc.

Alternatively, if the event does not correspond to receiving a request, then the event may correspond to a request to halt execution. In such scenario, the load management application halts execution (Step 275). At this stage, the user may decide to create/use a different load balancing decision function and reconfigure the load management application to use the different load balancing decision function.

In the following example, consider the scenario in which an application that processes telephone calls for a call center is deployed as four request handlers: request handler one, request handler two, request handler three, and request handler four. In the example, the call center receives the majority of the calls between 7:30 AM and 10:30 AM and between 4:30 PM and 6:00 PM. The servers upon which the request handlers are executing also execute applications to assist field technicians in performing repairs. Accordingly, a user wants a load balancing policy in which requests are routed in a manner such that between 7:30 AM and 10:30 AM and between 4:30 PM and 6:00 PM the calls are routed to any one of the four request handlers. However, the user also desires that the load balancing policy specify that between 6:00 PM and 7:30 AM and between 10:30 AM and 4:30 PM, calls are routed to only two of the request handlers. Thus, the servers upon which the remaining two request handlers are executing can spend more resources executing applications to assist field technicians in performing repairs. Additionally, the user may also desire that if failure occurs on one of the two servers between 6:00 PM and 7:30 AM and between 10:30 AM and 4:30 PM, then calls are routed to one of the unused servers.

Continuing with the example, a customer purchases a load management application to manage the server cluster. The user administering the server cluster creates a custom load balancing decision function that implements the load balancing policy defined above. Specifically, the custom load balancing decision function is designed by the user so as to comply with the API specified by the load management application. Further, the user also creates a custom dynamic clustering function to handle the failure of a server as described above. Next, the user accesses the configuration file of the load management application to update the location of the load balancing decision function, the location of the dynamic clustering function, and to change the load balancing policy indicator to reflect that a custom load balancing decision function is used.

As the load management application is executing, the load management application consults the custom load balancing decision function to determine to which of the request handler is to receive the calls as the calls are received. Thus, between 7:30 AM and 10:30 AM and between 4:30 PM and 6:00 PM, the calls are routed to any one of the four request handlers, and between 6:00 PM and 7:30 AM and between 10:30 AM and 4:30 PM, calls are routed to only two of the request handlers.

Continuing with the example, consider the scenario in which one of the request handlers fails between 6:00 PM and 7:30 AM and between 10:30 AM and 4:30 PM. When the load management application learns of the failure, the load management application calls the custom dynamic clustering function. The custom dynamic clustering function reconfigures the custom load balancing decision function to use one of the two servers not in use between 6:00 PM and 7:30 AM or between 10:30 AM and 4:30 PM. Thus, the custom dynamic clustering function may handle failure according to the desires of the user. As shown in the example, by creating a custom load balancing decision function and custom dynamic clustering function, the user is able to implement a load balancing policy that is specific to the server cluster of the customer.

Figure 5:
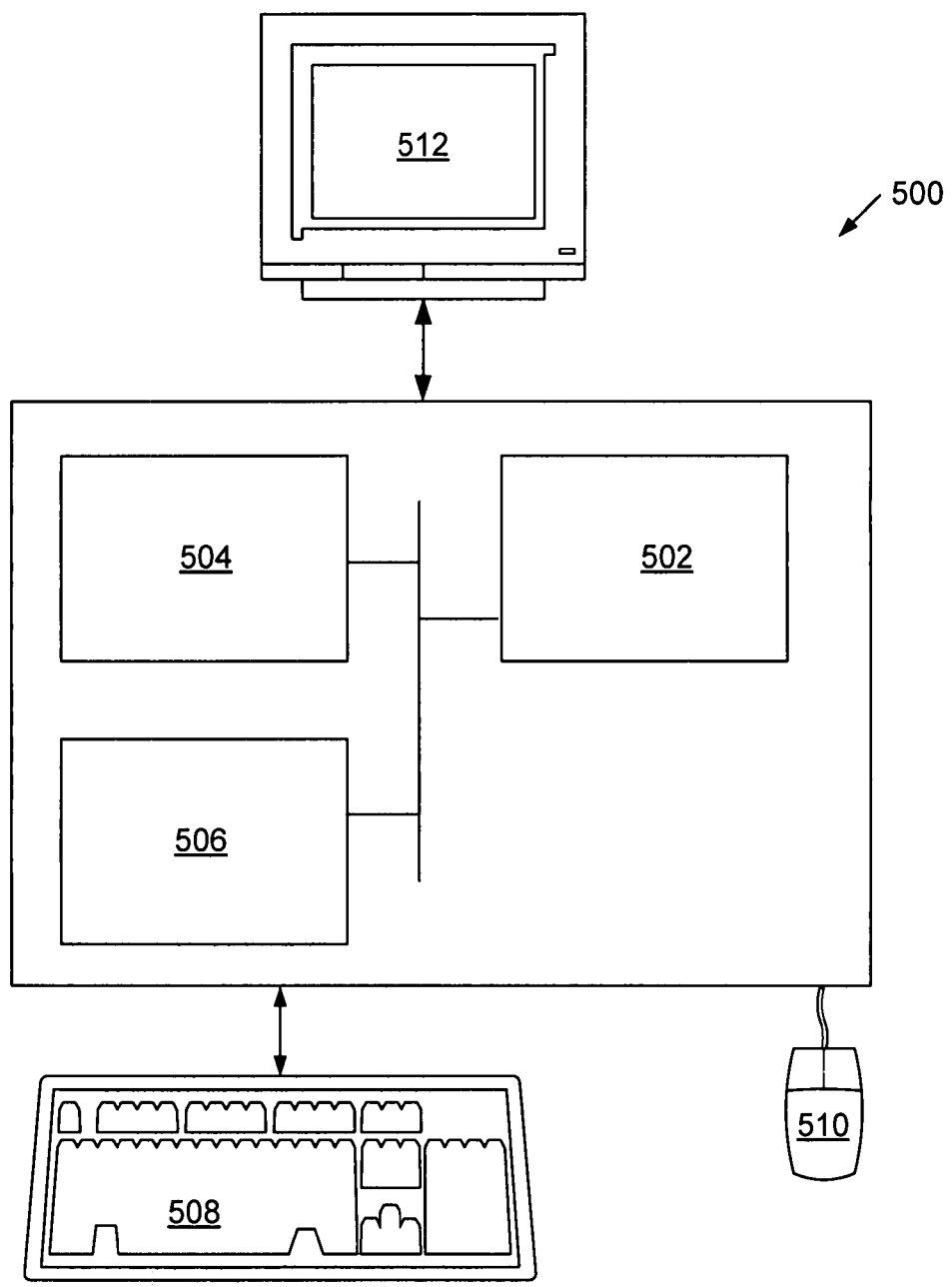
FIG. 5 shows a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., load management application, request handlers, user defined load balancer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for a user to determine how load balancing is performed. Specifically, by creating a mechanism whereby the user may define a custom load balancing decision function, embodiments of the invention allow the user to define load balancing according to the requirements of the server cluster. More specifically, in one or more embodiments of the invention, using an API published by the load management application, a user may plug in a custom load balancing decision function.

Further, embodiments of the invention provide a mechanism for a user to define how to handle changes in the server cluster. For example, a user may define how changes are handled when failure occurs or when a new server is added to the server cluster.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for load balancing in a server cluster comprising:
    configuring a load management application to use a load balancing decision function selected from a plurality of load balancing decision functions,
        wherein the plurality of load balancing decision functions comprises a default load balancing decision function and a custom load balancing decision function, wherein the default load balancing decision function is any load balancing decision function that is part of the load management application when the load management application is sent to a customer using the server cluster,
        wherein the custom load balancing decision function is created by a user, associated with the customer, for the server cluster, wherein the user creates the custom load balancing decision function by creating a method in a programming language, wherein the custom load balancing decision function implements a first application programming interface (API) specified by the load management application, and wherein the custom load balancing decision is not part of the load management application;
    receiving a request in the server cluster;
    selecting, for the request, a request handler from a plurality of request handlers by:
        performing, by the load management application, a method call on the custom load balancing decision function according to the first API, wherein the method call comprises a request attribute of the request;
        selecting, by the custom load balancing decision function, the request handler to process the request based on the request attribute; and
        receiving, by the load management application from the custom load balancing decision function, an identifier of the request handler in response to the method call; and
    transmitting, by the load management application, the request to the request handler.

2. The method of claim 1, wherein the load management application comprises the default load balancing function, wherein the custom load balancing decision function comprises a plug-in function to the load management application, and wherein the plug-in function is provided separately from the load management application.

3. The method of claim 1, wherein the plurality of load balancing decision functions further comprises a weighted round robin load balancing decision function configurable based on a plurality of weights corresponding to the plurality of request handlers.

4. The method of claim 1, wherein the request attribute is used by the custom load balancing decision function to determine whether the request requires the request handler to satisfy at least one selected from a group consisting of a throughput requirement, a memory requirement, a security capabilities requirement, a schedule requirement, a location requirement, and a reliability requirement.

5. The method of claim 1, wherein configuring the load management application is performed based on a value of a load balancing policy indicator.

6. The method of claim 1, further comprising:
configuring the load management application to use a custom dynamic clustering function of a plurality of dynamic clustering functions,
wherein the plurality of dynamic clustering functions comprises a default dynamic clustering function and the custom dynamic clustering function,
wherein each of the plurality of dynamic clustering functions defines operations to handle failure in the server cluster,
wherein the custom dynamic clustering function is created by the user to handle failure in the server cluster, and wherein the custom dynamic clustering function implements a second API specified by the load management application;
detecting, by the load management application, a failure in the server cluster;
calling, by the load management application, the custom dynamic clustering function based on detecting the failure; and
reconfiguring, by the custom dynamic clustering function, the custom load balancing decision function based on the failure.

7. The method of claim 6, further comprising:
initializing, based on the failure, an uninitialized request handler of the plurality of request handlers according to operations defined in the custom dynamic clustering function.

8. The method of claim 6, further comprising:
sending; based on the failure, a notification to the user according to operations defined in the custom dynamic clustering function.

9. A server cluster comprising:
a plurality of servers each comprising:
memory; and
a processor configured to execute a plurality of request handlers for receiving requests,
wherein at least one server of the plurality of servers is configured to execute, using the processor, a load management application configured to use a custom load balancing decision function selected from a plurality of load balancing decision functions,
wherein the plurality of load balancing decision functions comprises a default load balancing decision function and the custom load balancing decision function, wherein the default load balancing decision function is any load balancing decision function that is part of the load management application when the load management application is sent to a customer using the server cluster,
wherein the custom load balancing decision function is created by a user, associated with the customer, for the server cluster, wherein the user creates the custom load balancing decision function by creating a method in a programming language, wherein the custom load balancing decision function implements a first application programming interface (API) specified by the load management application, and wherein the custom load balancing decision is not part of the load management application, and
wherein the load management application:
selects, for a request, a request handler from the plurality of request handlers when the server cluster receives the request by:
performing a method call on the custom load balancing decision function according to the first API, wherein the method call comprises a request attribute of the request, and wherein the custom load balancing decision function selects the request handler to process the request based on the request attribute; and
receiving, from the custom load balancing decision function, an identifier of the request handler in response to the method call; and
transmits the request to the request handler.

10. The server cluster of claim 9, wherein the load management application comprises the default load balancing function, wherein the custom load balancing decision function comprises a plug-in function to the load management application, and wherein the plug-in function is provided separately from the load management application.

11. The server cluster of claim 9, wherein the plurality of load balancing decision functions further comprises a weighted round robin load balancing decision function configurable based on a plurality of weights corresponding to the plurality of request handlers.

12. The server cluster of claim 9, wherein the request attribute is used by the custom load balancing decision function to determine whether the request requires the request handler to satisfy at least one selected from a group consisting of a throughput requirement, a memory requirement, a security capabilities requirement, a schedule requirement, a location requirement, and a reliability requirement.

13. The server cluster of claim 9, wherein the identifier of the request handler is a uniform resource locator of the request handler.

14. The server cluster of claim 9, wherein configuring the load management application to use the custom load balancing decision function is performed based on a value of a load balancing policy indicator.

15. The server cluster of claim 9,
wherein the load management application is further configured to use a custom dynamic clustering function of a plurality of dynamic clustering functions,
wherein the plurality of dynamic clustering functions comprises a default dynamic clustering function and the custom dynamic clustering function,
wherein each of the plurality of dynamic clustering functions defines operations to handle failure in the server cluster,
wherein the custom dynamic clustering function is created by the user to handle failure in the server cluster, and wherein the custom dynamic clustering function implements a second API specified by the load management application, and
wherein the load management application further:
detects a failure in the server cluster; and
calls the custom dynamic clustering function based on detecting the failure, wherein the custom dynamic clustering function reconfigures the custom load balancing decision function based on the failure.

16. A non-transitory computer readable medium comprising computer readable program code embodied therein for causing a computer system to load balance in a server cluster by:
- configuring a load management application to use a load balancing decision function selected from a plurality of load balancing decision functions,
  - wherein the plurality of load balancing decision functions comprises a default load balancing decision function and a custom load balancing decision function, wherein the default load balancing decision function is any load balancing decision function that is part of the load management application when the load management application is sent to a customer using the server cluster,
  - wherein the custom load balancing decision function is created by a user, associated with the customer, for the server cluster, wherein the user creates the custom load balancing decision function by creating a method in a programming language, wherein the custom load balancing decision function implements a first application programming interface (API) specified by the load management application, and wherein the custom load balancing decision is not part of the load management application;
- receiving a request in the server cluster;
- selecting, for the request, a request handler from a plurality of request handlers by:
  - performing, by the load management application, a method call on the custom load balancing decision function according to the first API, wherein the method call comprises a request attribute of the request, and wherein the custom load balancing decision function selects the request handler to process the request based on the request attribute; and
  - receiving, by the load management application from the custom load balancing decision function, an identifier of the request handler in response to the method call; and
- transmitting the request to the request handler.

17. The non-transitory computer readable medium of claim 16, wherein the load management application comprises the default load balancing function, wherein the custom load balancing decision function comprises a plug-in function to the load management application, and wherein the plug-in function is provided separately from the load management application.

18. The non-transitory computer readable medium of claim 17, wherein configuring the load management application to use the custom load balancing decision function is performed based on a value of a load balancing policy indicator.

19. The non-transitory computer readable medium of claim 16, further comprising computer readable program code to further cause the computer system to load balance in the server cluster by:
- configuring the load management application to use a custom dynamic clustering function of a plurality of dynamic clustering functions,
  - wherein the plurality of dynamic clustering functions comprises a default dynamic clustering function and the custom dynamic clustering function,
  - wherein each of the plurality of dynamic clustering functions defines operations to handle failure in the server cluster,
  - wherein the custom dynamic clustering function is created by the user to handle failure in the server cluster, and wherein the custom dynamic clustering function implements a second API specified by the load management application;
- detecting a failure in the server cluster; and
- calling, by the load management application, the custom dynamic clustering function based on detecting the failure, wherein the custom dynamic clustering function reconfigures the custom load balancing decision function based on the failure.

* * * * *

UNITED STATES PATENT AND TRADEMARK OFFICE
CERTIFICATE OF CORRECTION

PATENT NO. : 9,026,655 B2  
APPLICATION NO. : 11/700646  
DATED : April 28, 2015  
INVENTOR(S) : Duvur et al.

Page 1 of 1

It is certified that error appears in the above-identified patent and that said Letters Patent is hereby corrected as shown below:

On the title page item [75], delete "Freemont," and insert -- Fremont, --, therefor.

In the claims

Column 13, line 40, Claim 8, delete "sending;" and insert -- sending, --, therefor.

Signed and Sealed this  
Seventeenth Day of May, 2016

Michelle K. Lee  
*Director of the United States Patent and Trademark Office*